United States Patent [19]

Templeton

[11] Patent Number: 5,481,813
[45] Date of Patent: Jan. 9, 1996

[54] TAPE MEASURE END RETENTION APPARATUS

[76] Inventor: Harvey J. Templeton, 11934 Beverly DR., Houston, Tex. 77065

[21] Appl. No.: 243,202

[22] Filed: May 16, 1994

[51] Int. Cl.[6] .................................................. G01B 3/10
[52] U.S. Cl. ............................................. 33/758; 33/770
[58] Field of Search .......................... 33/756, 757, 758, 33/760, 770, 755, 529

[56] References Cited

U.S. PATENT DOCUMENTS

| | | | |
|---|---|---|---|
| 756,633 | 4/1904 | Herrick | 33/758 |
| 812,322 | 2/1906 | Badger | 33/760 |
| 2,065,143 | 12/1936 | Metcalf | 33/760 |
| 2,396,877 | 3/1946 | Peterson | 33/770 |
| 3,036,791 | 5/1962 | Siggelkow | 33/758 |
| 3,100,937 | 8/1963 | Burch | 33/770 |
| 3,145,477 | 8/1964 | Morrison | 33/770 |
| 3,662,471 | 5/1972 | Lynde | 33/770 |
| 3,965,579 | 6/1976 | Woods | 33/758 |
| 4,353,167 | 10/1982 | Martin | 33/770 |
| 4,827,622 | 5/1989 | Makar | 33/770 |
| 4,864,734 | 9/1989 | Woodard et al. | 33/770 |
| 5,077,907 | 1/1992 | Furr | 33/770 |

FOREIGN PATENT DOCUMENTS

| | | | |
|---|---|---|---|
| 120902 | 7/1984 | Japan | 33/758 |
| 30048 | of 1911 | United Kingdom | 33/756 |
| 696508 | 9/1953 | United Kingdom | 33/758 |
| 1604029 | 12/1981 | United Kingdom | 33/755 |

*Primary Examiner*—Thomas B. Will

[57] ABSTRACT

A new and improved tape measure end retention apparatus includes a base assembly and a screw clamp assembly connected to the base assembly. The screw clamp assembly extends over a top side of the base assembly and is adapted to secure a free end of a tape measure to the base assembly. The screw clamp assembly includes a pressure plate which includes a convex-shaped damping surface, and a first concave channel is adapted to be placed in registration with the convex-shaped clamping surface. The screw assembly includes a knurled knob for rotating the screw assembly. A plurality of magnets are located at the bottom side of the base assembly and include a first magnet, a second magnet, and a third magnet each of which extends longitudinally along the base assembly. The magnets are retained in complementary magnet-receiving channels located in the bottom side of the base assembly. The magnet-receiving channels include channel walls each of which includes apertures that are in registration with each other. The first magnet includes a first alignment slot placed in registration with the apertures. The second magnet includes an alignment aperture placed in registration with the apertures. The third magnet includes a second alignment slot placed in registration with the apertures. A keeper pin is inserted through the registered apertures and the alignment slots for retaining the magnets in the base assembly.

11 Claims, 3 Drawing Sheets

TAPE MEASURE END RETENTION APPARATUS

BACKGROUND OF THE INVENTION

1. Field of the Invention

The present invention relates generally to tape measures and, more particularly, to devices especially adapted for securing the free end of a tape measure to an object so as to permit one person to use the tape measure without the assistance of a second person.

2. Description of the Prior Art

Tape measures are widely used tools in construction, surveying, and other activities in which measurements of length are taken. Many tape measures include a right-angled tab located at the free end of the tape measure. The tab is used to catch on a corner of an object to secure the free end of the tape measure to the corner so that the remainder of the tape measure can be unspooled and extended. Unfortunately, without a continuous tension force being exerted longitudinally along the length of the tape, the tab has a tendency to fall off of the corner, and it is often very difficult to exert such a necessary tension force. In this respect, it would be desirable if a device were provided which retained a free end of a tape measure on a structure without the need for a continuous longitudinal tension to be exerted by the tape on a right-angled tab.

There are uses of a tape measure which are not related to corners of a structure. For example, a tape measure is often used to measure lengths of steel beams and iron-containing pipes. In such instances, a right-angled tab at the free end of the tape measure is not useful in securing the free end. In this respect, it would be desirable if a device were provided for securing the free end of a tape measure to an iron-containing structure.

Throughout the years, a number of innovations have been developed relating to securing a free end of a tape measure onto a structure, and the following U.S. patents are representative of some of those innovations: U.S. Pat. Nos. 3,965,579; 4,353,167; 4,827,622; and 5,077,907. More specifically, U.S. Pat. No. 3,965,579 discloses an L-shaped anchor member located at a right-angled tab at the free end of the tape measure. The right-angled tab is adapted to contact a corner of a structure.

U.S. Pat. Nos. 4,353,167, 4,827,622 and 5,077,907 all disclose devices for securing the free end of a tape measure on an iron-containing structure by using a magnet. More specifically, U.S. Pat. No. 4,353,167 discloses an apparatus for holding and positioning a measuring tape by using a clamp that is pivotally joined to a base that includes a single permanent magnet. The pivotal nature of the clamp may have the effect that a strong clamping action may not be exerted on the free end of the tape measure. In this respect, it would be desirable if a device were provided which permits a strong clamping action to be exerted on the free end of a tape measure.

U.S. Pat. No. 4,827,622 discloses a device that contains a bracket that is slidably received with a frictional fit on a tape measure. A magnet is held by the bracket, and the device can be used as a level and a square. The frictional fit of the bracket to the tape measure may not permit a secure attachment of the tape measure to the bracket. In this respect, it would be desirable if a device were provided for securing the free end of a tape measure to a structure which did not include a frictional engagement between the device and the tape measure.

U.S. Pat. No. 5,077,907 discloses a pipe measuring apparatus that is adapted to secure a free end of a tape measure to an open end of a pipe or conduit. Measurements often need to be made along a pipe that is in place and does not have an open end. In this respect, it would be desirable if a device were provided for securing a free end of a tape measure to a pipe so that measurements can be made along an in place pipe that does not have an open end.

Still other features would be desirable in a tape measure end retention device. For example, the cross-sectional contour of the tape of a tape measure is often convexly shaped. Therefore, the tape measure end retention device should be especially adapted for securing a convexly shaped tape.

A pipe is generally cylindrically shaped and, as such, has a round exterior surface. In this respect, it would be desirable if a device were provided for securing the free end of a tape measure to the round exterior surface of a cylindrical pipe.

Thus, while the foregoing body of prior art indicates it to be well known to use devices to secure the free end of a tape measure to a structure, the prior art described above does not teach or suggest a tape measure end retention apparatus which has the following combination of desirable features: (1) retains a free end of a tape measure on a structure without the need for a continuous longitudinal tension to be exerted by the tape on a right-angled tab; (2) provides for securing the free end of a tape measure to an iron-containing structure; (3) permits a strong clamping action to be exerted on the free end of a tape measure; (4) secures the free end of a tape measure to a structure without including a frictional engagement between the device and the tape measure; (5) secures a free end of a tape measure to a pipe so that measurements can be made along an in-place pipe that does not have an open end; (6) is especially adapted for securing the free end of a convexly shaped tape; and (7) secures the free end of a tape measure to the round exterior surface of a cylindrical pipe. The foregoing desired characteristics are provided by the unique tape measure end retention apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved tape measure end retention apparatus which includes a base assembly and a screw clamp assembly connected to the base assembly. The screw clamp assembly extends over a top side of the base assembly. The screw damp assembly is adapted to secure a free end of a tape measure to the base assembly. A plurality of magnets are connected to the base assembly such that the magnets project from a bottom side of the base assembly. The magnets are adapted to connect the apparatus to a magnetizable structure. The top side of the base assembly includes a first concave channel. The screw clamp assembly includes a pressure plate which includes a convex-shaped clamping surface, and the first concave channel is adapted to be placed in registration with the convex-shaped clamping surface.

The top side of the base assembly includes a second concave channel. The pressure plate is adapted to rotate with respect to the base assembly, and the second concave channel is adapted to be placed in registration with the convex-shaped clamping surface when the pressure plate is rotated to be placed in registration with the second concave channel. The first concave channel is oriented perpendicularly with respect to the second concave channel.

The screw clamp assembly includes a support post which extends upward perpendicularly from the base assembly. A transverse support assembly is connected to the support post and extends over the top side of the base assembly. The transverse support assembly includes a threaded channel. A screw assembly engages the threaded channel. A ball joint assembly is connected between the screw assembly and a pressure plate. The screw assembly includes a knurled knob for rotating the screw assembly.

The base assembly includes four corners, and the support post extends upward perpendicularly from the base assembly from a first corner of the base assembly. The transverse support assembly extends over the top side of the base assembly in a diagonal direction from the first corner to an opposite second corner. The threaded channel and the screw assembly are located in respective positions central to the base assembly. The ball joint assembly includes a ball end on the screw assembly and a socket in the pressure plate.

The plurality of magnets includes a first magnet extending longitudinally along the base assembly, a second magnet extending longitudinally along the base assembly, and a third magnet extending longitudinally along the base assembly. The first magnet, the second magnet, and the third magnet are parallel to each other. The magnets are retained in complementary magnet-receiving channels located in the bottom side of the base assembly. The magnet-receiving channels include channel walls each of which includes apertures that are in registration with each other.

The first magnet includes a first alignment slot placed in registration with the apertures. The second magnet includes an alignment aperture placed in registration with the apertures. The third magnet includes a second alignment slot placed in registration with the apertures. A keeper pin is inserted through the registered apertures of the channel walls, the first alignment slot of the first magnet, the alignment aperture of the second magnet, and the second alignment slot of the third magnet. The keeper pin retains the first magnet, the second magnet, and the third magnet in the respective magnet-receiving channels.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tape measure end retention apparatus which has all of the advantages of the prior art and none of the disadvantages.

It is another object of the present invention to provide a new and improved tape measure end retention apparatus which may be easily and efficiently manufactured and marketed.

It is a further object of the present invention to provide a new and improved tape measure end retention apparatus which is of durable and reliable construction.

An even further object of the present invention is to provide a new and improved tape measure end retention apparatus which is susceptible of a low cost of manufacture with regard to both materials and labor, and which accordingly is then susceptible of low prices of sale to the consuming public, thereby making such tape measure end retention apparatus available to the buying public.

Still yet a further object of the present invention is to provide a new and improved tape measure end retention apparatus which retains a free end of a tape measure on a structure without the need for a continuous longitudinal tension to be exerted by the tape on a right-angled tab.

Still another object of the present invention is to provide a new and improved tape measure end retention apparatus that secures the free end of a tape measure to an iron-containing structure.

Yet another object of the present invention is to provide a new and improved tape measure end retention apparatus which permits a strong clamping action to be exerted on the free end of a tape measure.

Even another object of the present invention is to provide a new and improved tape measure end retention apparatus that secures the free end of a tape measure to a structure without including a frictional engagement between the device and the tape measure.

Still a further object of the present invention is to provide a new and improved tape measure end retention apparatus which secures a free end of a tape measure to a pipe so that measurements can be made along an in-place pipe that does not have an open end.

Yet another object of the present invention is to provide a new and improved tape measure end retention apparatus that is especially adapted for securing the free end of a convexly shaped tape.

Still another object of the present invention is to provide a new and improved tape measure end retention apparatus which secures the free end of a tape measure to the round exterior surface of a cylindrical pipe.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved tape measure end retention apparatus embodying the principles and concepts of the present invention will be described.

Figure 5:
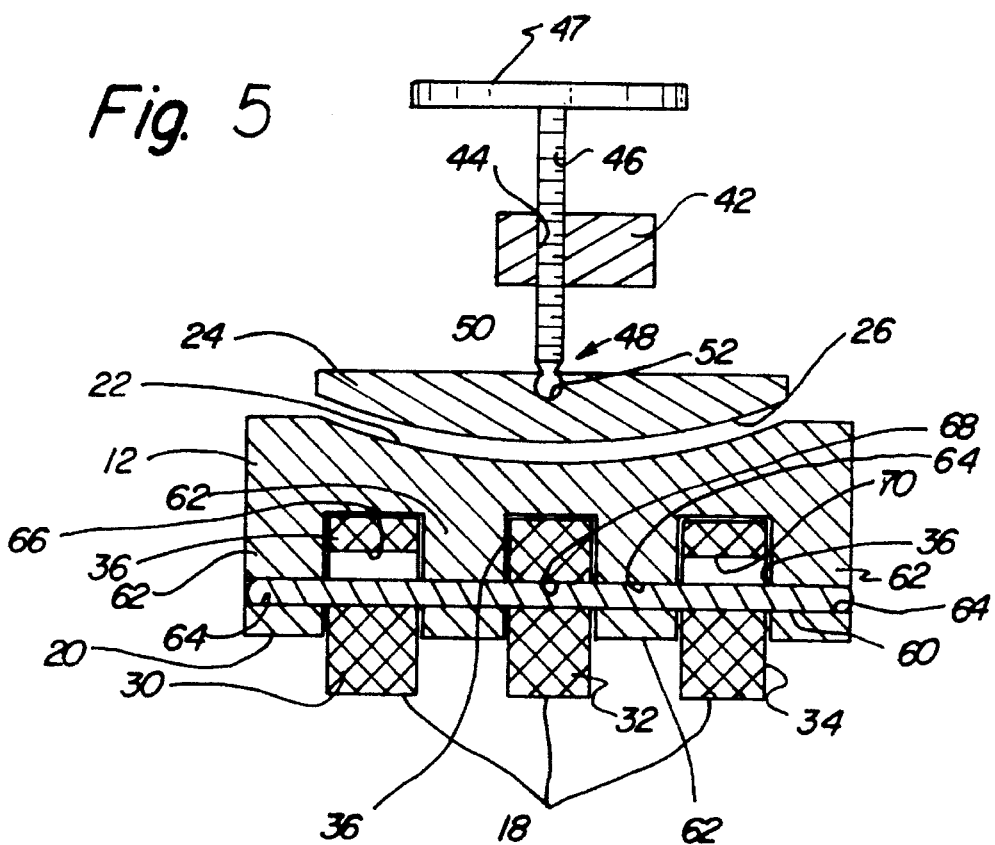
FIG. 5 is an enlarged cross-sectional view of the embodiment of the invention taken along line 5—5 of FIG. 3.
Figure 6:
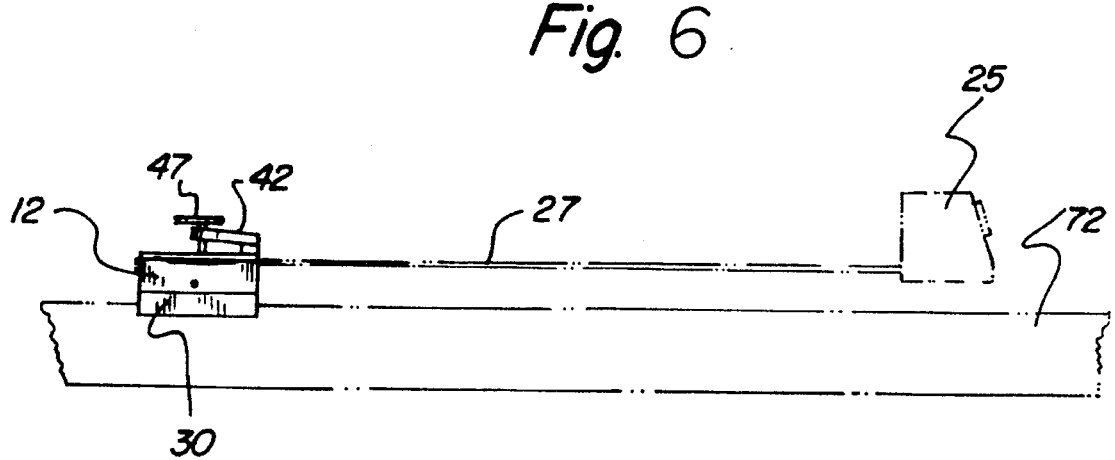
FIG. 6 a side view of the embodiment of the invention shown in FIG. 5 installed on the outside of a pipe and in use with a tape measure.

Turning to FIGS. 1–6, there is shown an exemplary embodiment of the tape measure end retention apparatus of the invention generally designated by reference numeral 10. In its preferred form, tape measure end retention apparatus 10 includes a base assembly 12 and a screw clamp assembly 14 connected to the base assembly 12. The screw clamp assembly 14 extends over a top side 16 of the base assembly 12. The screw clamp assembly 14 is adapted to secure a free end of a tape measure to the base assembly 12. A plurality of magnets 18 are connected to the base assembly 12 such that the magnets 18 project from a bottom side 20 of the base assembly 12. The magnets 18 are adapted to connect the apparatus to a magnetizable structure. Generally, the tape measure includes a housing 25 and a tape portion 27 that is spooled into and unspooled out of the housing 25 as shown in FIG. 6. The top side 16 of the base assembly 12 includes a first concave channel 22. The screw clamp assembly 14 includes a pressure plate 24 which includes a convex-shaped clamping surface 26, and the first concave channel 22 is adapted to be placed in registration with the convex-shaped clamping surface 26. A tape portion 27 of a tape measure generally includes a convex cross-section. The first concave channel 22 and the convex-shaped clamping surface 26 are adapted to clamp the convex-shaped tape portion therebetween.

The top side 16 of the base assembly 12 includes a second concave channel 23. The pressure plate 24 is adapted to rotate with respect to the base assembly 12, and the second concave channel 23 is adapted to be placed in registration with the convex-shaped clamping surface 26 when the pressure plate 24 is rotated to be placed in registration with the second concave channel 23. The first concave channel 22 is oriented perpendicularly with respect to the second concave channel 23. A free end of the tape portion 27 of the tape measure can be clamped between the pressure plate 24 and either the first concave channel 22 or the second concave channel 23.

The screw clamp assembly 14 includes a support post 40 which extends upward perpendicularly from the base assembly 12. A transverse support assembly 42 is connected to the support post 40 and extends over the top side 16 of the base assembly 12. The transverse support assembly 42 includes a threaded channel 44. A screw assembly 46 engages the threaded channel 44. A ball joint assembly 48 is connected between the screw assembly 46 and a pressure plate 24. The screw assembly 46 includes a knurled knob 47 for rotating the screw assembly 46.

Figure 3:
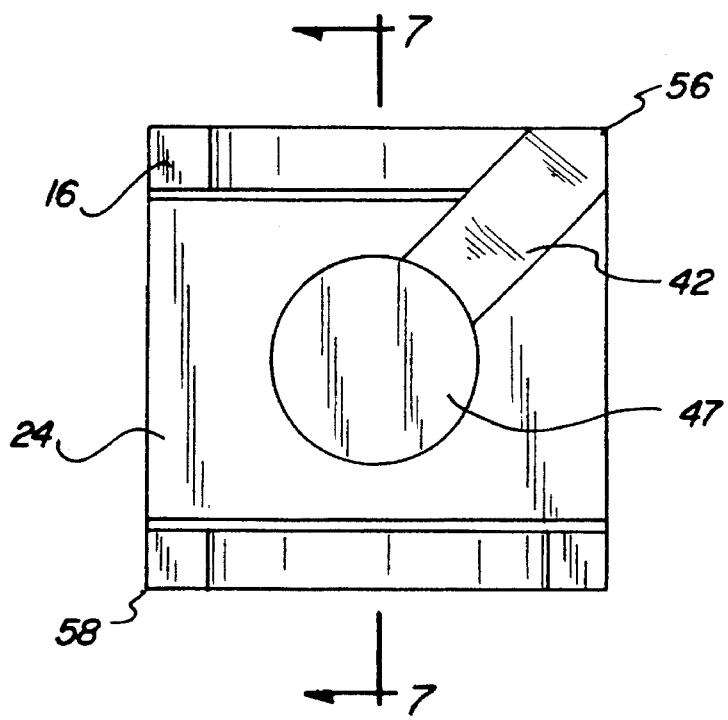
FIG. 3 is a top view of the embodiment of the tape measure end retention apparatus of FIG. 2.
Figure 4:
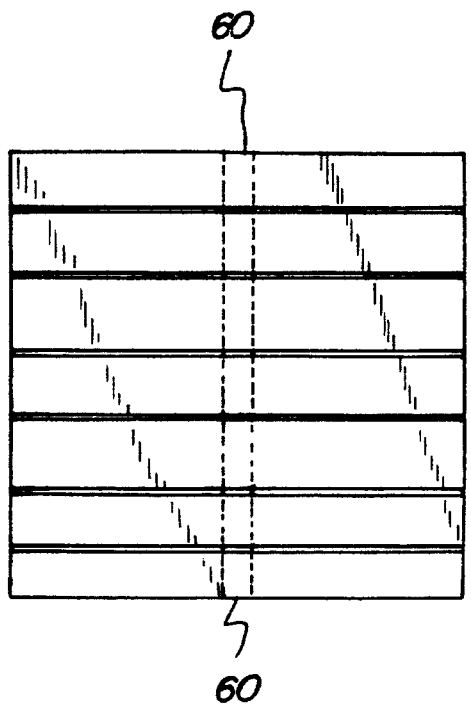
FIG. 4 is a bottom view of the embodiment of the invention shown in FIG. 3.

As shown in FIG. 3, the base assembly 12 includes four corners, and the support post 40 extends upward perpendicularly from the base assembly 12 from a first corner 56 of the base assembly 12. The transverse support assembly 42 extends over the top side 16 of the base assembly 12 in a diagonal direction from the first corner 56 to an opposite second corner 58. The threaded channel 44 and the screw assembly 46 are located in respective positions central to the base assembly 12. The ball joint assembly 48 includes a ball end 50 on the screw assembly 46 and a socket 52 in the pressure plate 24.

The plurality of magnets 18 includes a first magnet 30 extending longitudinally along the base assembly 12, a second magnet 32 extending longitudinally along the base assembly 12, and a third magnet 34 extending longitudinally along the base assembly 12. The first magnet 30, the second magnet 32, and the third magnet 34 are parallel to each other. The magnets 18 are retained in complementary magnet-receiving channels 36 located in the bottom side 20 of the base assembly 12. The magnet-receiving channels 36 include channel walls 62 each of which includes apertures 64 that are in registration with each other.

The first magnet 30 includes a first alignment slot 66 placed in registration with the apertures 64. The second magnet 32 includes an alignment aperture 68 placed in registration with the apertures 64. The third magnet 34 includes a second alignment slot 70 placed in registration with the apertures 64. A keeper pin 60 is inserted through the registered apertures 64 of the channel walls 62, the first alignment slot 66 of the first magnet 30, the alignment aperture 68 of the second magnet 32, and the second alignment slot 70 of the third magnet 34. The keeper pin 60 retains the first magnet 30, the second magnet 32, and the third magnet 34 in the respective magnet-receiving channels 36.

Figure 2:
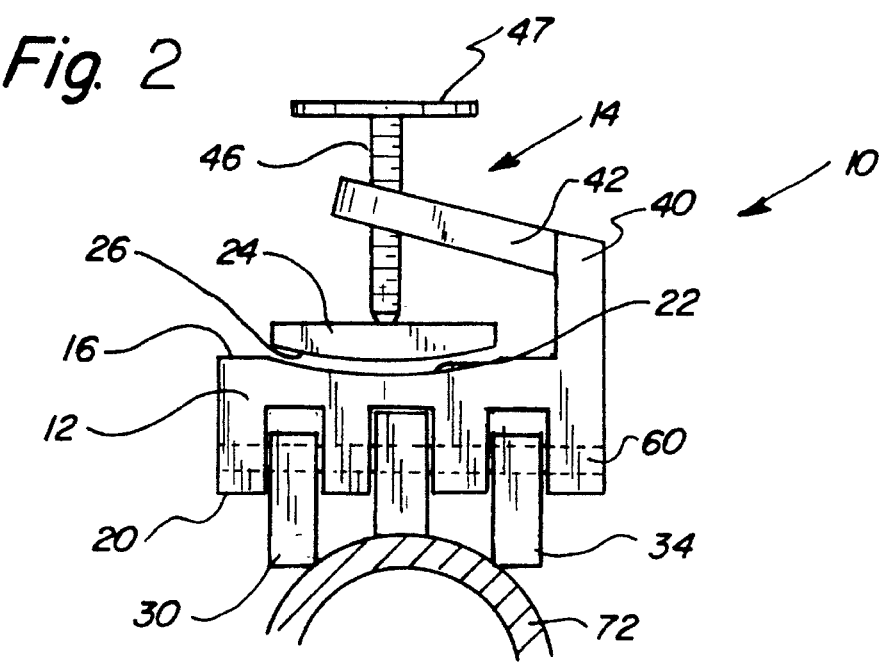
FIG. 2 is a side view of the embodiment of the tape measure end retention apparatus shown in FIG. 1 placed on a cylindrical surface such as the outside of a pipe.

When the tape measure end retention apparatus 10 of the invention is placed on a curved surface as shown in FIG. 2, the first magnet 30 and the third magnet 34 drop so that the top portion of the first alignment slot 66 of the first magnet 30 and the top portion of the second alignment slot 70 of the third magnet 34 rest on the keeper pin 60. This action, in effect, permits the first magnet 30 and the third magnet 34 to drop a predetermined distance to contact a curved surface, such as pipe 72 shown in FIGS. 2 and 6.

Figure 1:
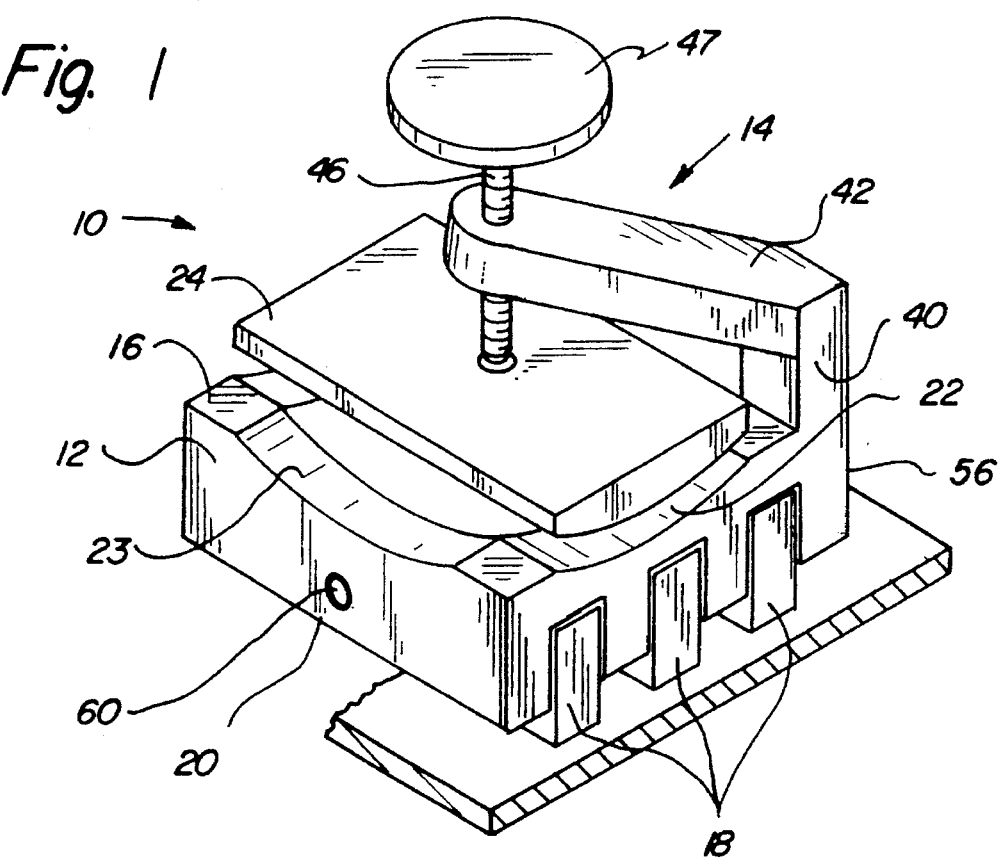
FIG. 1 is a perspective view showing a preferred embodiment of the tape measure end retention apparatus of the invention placed on a flat surface.

Alternatively, when the tape measure end retention apparatus 10 of the invention is placed on a flat surface, as shown in FIGS. 1 and 5, the first magnet 30 will ride up in its first alignment slot 66, and the third magnet 34 will ride up in its second alignment slot 70.

In using the tape measure end retention apparatus 10 of the invention, the apparatus is placed on a surface, such as an iron-containing surface or other magnetic surface. A free end of a tape measure is placed on either the first concave channel 22 or the second concave channel 23, and the pressure plate 24 is screwed down on the free end of the tape measure by turning the screw assembly 46 with the knurled knob 47. After a sufficient turning of the knurled knob 47, the free end of the tape measure is clamped between the pressure plate 24 and the selected first concave channel 22 or second concave channel 23. To release the free end of the tape measure from the apparatus of the invention, the knurled knob 47 is turned in the opposite direction, and the clamping action of the pressure plate 24 on the free end of the tape measure is relieved. Then, the free end of the tape measure can be removed from the apparatus.

The components of the tape measure end retention apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tape measure end retention apparatus that is low in cost, relatively simple in design and operation, and which may advantageously be used to retain a free end of a tape measure on a structure without the need for a continuous longitudinal tension to be exerted by the tape on a right-angled tab. With the invention, a tape measure end retention apparatus secures the free end of a tape measure to an iron-containing structure. With the invention, a tape measure end retention apparatus is provided which permits a strong clamping action to be exerted on the free end of a tape measure. With the invention, a tape measure end retention apparatus is provided which secures the free end of a tape measure to a structure without including a frictional engagement between the device and the tape measure. With the invention, a tape measure end retention apparatus is provided which secures a free end of a tape measure to a pipe so that measurements can be made along an in-place pipe that does not have an open end. With the invention, a tape measure end retention apparatus is provided which is especially adapted for securing the free end of a convexly shaped tape. With the invention, a tape measure end retention apparatus is provided which secures the free end of a tape measure to the round exterior surface of a cylindrical pipe.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A new and improved tape measure end retention apparatus, comprising:

a base assembly, a screw clamp assembly connected to said base assembly, said screw clamp assembly extending over a top side of said base assembly, said screw clamp assembly adapted to secure a free end of a tape measure to said base assembly, and a plurality of magnets connected to said base assembly such that said magnets project from a bottom side of said base assembly, said magnets adapted to connect said apparatus to a magnetizable structure wherein said top side of said base assembly includes a first concave channel, said screw clamp assembly includes a pressure plate which includes a convex-shaped clamping surface, said screw clamp assembly further including means for permitting said pressure plate to rotate about an axis passing through said pressure plate, and said first concave channel is adapted to be placed in registration with said convex-shaped clamping surface, and wherein said top side of said base assembly includes a second concave channel, and said second concave channel is adapted to be placed in registration with said convex-shaped clamping surface when said pressure plate is rotated to be placed in registration with said second concave channel via said rotation means.

2. The apparatus described in claim 1 wherein said first concave channel is oriented perpendicularly with respect to said second concave channel.

3. The apparatus described in claim 1 wherein said screw claim assembly includes:

a support post which extends upward perpendicularly from said base assembly, a transverse support assembly connected to said support post and extending over said top side of said base assembly, wherein said transverse support assembly includes a threaded channel, and a screw assembly engaging said threaded channel, said pressure plate, and a ball joint assembly connected between said screw assembly and said pressure plate.

4. The apparatus described in claim 3 wherein said screw assembly includes a knurled knob for rotating said screw assembly.

5. The apparatus described in claim 3 wherein:

said base assembly includes four corners, and said support post extends upward perpendicularly from said base assembly from a first corner of said base assembly.

6. The apparatus described in claim 5 wherein said transverse support assembly extends over said top side of said base assembly in a diagonal direction from said first corner to an opposite second corner.

7. The apparatus described in claim 6 wherein said threaded channel and said screw assembly are located in respective positions central to said base assembly.

8. The apparatus described in claim 3 wherein said ball joint assembly includes:

a ball end on said screw assembly, and a socket in said pressure plate.

9. The apparatus described in claim 1 wherein said plurality of magnets includes:

a first magnet extending longitudinally along said base assembly, a second magnet extending longitudinally along said base assembly, and a third magnet extending longitudinally along said base assembly, wherein said first magnet, said second magnet, and said third magnet are parallel to each other.

10. The apparatus described in claim 9 wherein said magnets are retained in complementary magnet-receiving channels located in said bottom side of said base assembly.

11. The apparatus described in claim 10 wherein:

said magnet-receiving channels include channel walls which include apertures that are in registration with each other, said first magnet includes a first alignment slot placed in registration with said apertures, said second magnet includes an alignment aperture placed in registration with said apertures, and said third magnet includes a second alignment slot placed in registration with said apertures, further including a keeper pin inserted through said registered apertures of said channel walls, said first alignment slot of said first magnet, said alignment aperture of said second magnet, and said second alignment slot of said third magnet, wherein said keeper pin retains said first magnet, said second magnet, and said third magnet in said respective magnet-receiving channels.

* * * * *